(12) United States Patent
Yamazoe et al.

(10) Patent No.: US 8,594,433 B2
(45) Date of Patent: Nov. 26, 2013

(54) IMAGE PROCESSING APPARATUS, IMAGE PROCESSING METHOD, AND COMPUTER-READABLE RECORDING MEDIUM

(75) Inventors: Manabu Yamazoe, Tokyo (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/167,864

(22) Filed: Jun. 24, 2011

(65) Prior Publication Data

US 2012/0014606 A1   Jan. 19, 2012

(30) Foreign Application Priority Data

Jul. 16, 2010 (JP) ................................. 2010-162289

(51) Int. Cl.
*G06K 9/46* (2006.01)
*G06K 9/36* (2006.01)

(52) U.S. Cl.
USPC .......................................... 382/190; 382/232

(58) Field of Classification Search
None
See application file for complete search history.

(56) References Cited

U.S. PATENT DOCUMENTS

| | | | | |
|---|---|---|---|---|
| 5,598,216 A * | 1/1997 | Lee | ........................ | 375/240.16 |
| 5,646,691 A * | 7/1997 | Yokoyama | ................ | 348/416.1 |
| 5,654,771 A * | 8/1997 | Tekalp et al. | ................ | 348/699 |
| 5,731,851 A * | 3/1998 | Jung | ............................ | 348/699 |
| 5,936,671 A * | 8/1999 | Van Beek et al. | ........ | 375/240.14 |
| 5,978,030 A * | 11/1999 | Jung et al. | ................ | 375/240.16 |
| 5,982,909 A * | 11/1999 | Erdem et al. | .................. | 382/103 |
| 6,047,088 A * | 4/2000 | van Beek et al. | ............. | 382/243 |
| 6,058,212 A * | 5/2000 | Yokoyama | .................... | 382/236 |
| 6,064,771 A * | 5/2000 | Migdal et al. | ................. | 382/232 |
| 7,013,042 B1 * | 3/2006 | Yamada et al. | ............... | 382/167 |
| 7,970,170 B2 * | 6/2011 | Tener et al. | .................... | 382/103 |
| 2002/0159518 A1 * | 10/2002 | Bottreau et al. | ........... | 375/240.1 |
| 2002/0159651 A1 * | 10/2002 | Tener et al. | .................... | 382/266 |
| 2003/0063672 A1 * | 4/2003 | Laurent-Chatenet | .... | 375/240.16 |
| 2004/0037471 A1 * | 2/2004 | Laurent-Chatenet et al. | | 382/236 |

(Continued)

FOREIGN PATENT DOCUMENTS

JP    3935500 B2    6/2007

OTHER PUBLICATIONS

Guo, D., Lu, Z., and Hu, X., Content-Based Mesh Design and Occlusion Adaptive GOP Structure, 2009, ICDIP '09 Proceedings of the International Conference on Digital Image Processing, vol. 392-396.*

(Continued)

*Primary Examiner* — Stephen R Koziol
*Assistant Examiner* — Jonathan S Lee
(74) *Attorney, Agent, or Firm* — Fitzpatrick, Cella, Harper & Scinto

(57) ABSTRACT

To improve the precision of a motion vector of a pixel included in an image by appropriately performing region division of the image. A plurality of images is obtained, any of the plurality of the obtained images is analyzed and a feature point of the image is extracted. A feature point of the image are added to the corners of the image and at least one feature point is added to any of positions on four sides formed by the feature points located at the corners of the image. Then, based on the extracted feature point and the added feature points, a motion vector of a pixel included in the image with respect to another image included in the plurality of images is determined.

20 Claims, 9 Drawing Sheets

(56) References Cited

U.S. PATENT DOCUMENTS

| | | | |
|---|---|---|---|
| 2004/0047415 A1* | 3/2004 | Robert et al. | 375/240.01 |
| 2005/0078753 A1* | 4/2005 | Nakaya et al. | 375/240.16 |
| 2005/0249426 A1* | 11/2005 | Badawy | 382/241 |
| 2008/0180535 A1* | 7/2008 | Habuka et al. | 348/208.4 |
| 2010/0272369 A1* | 10/2010 | Hiraga et al. | 382/195 |

OTHER PUBLICATIONS

Altunbasak, Y. and Tekalp, A.M., A Hybrid Video Codec with Block-Based and Mesh-Based Motion Compensation Modes, 1999, International Journal of Imaging Systems and Technology, vol. 9, No. 4, pp. 248-256.*

Laurent, N. and Robert, G., Mesh Based Video Coding at Very Low Bitrate, 2000, International Conference on Image Processing, vol. 2, pp. 871-874.*

Lechat, P. and Sanson, H., Combined Mesh Based Image Representation and Motion Estimation, Application to Video Coding, 1998, International Conference on Image Processing, vol. 2, pp. 909-913.*

Shewchuk, J.R., Delaunay refinement algorithms for triangular mesh generation, 2002, Computational Geometry, vol. 22, pp. 21-74.*

Miller, G.L., Talmor, D., and Teng, S.H., Optimal good-aspect-ratio coarsening for unstructured meshes, 1997, Proceedings of the eighth annual ACM-SIAM symposium on Discrete algorithms, pp. 538-547.*

* cited by examiner

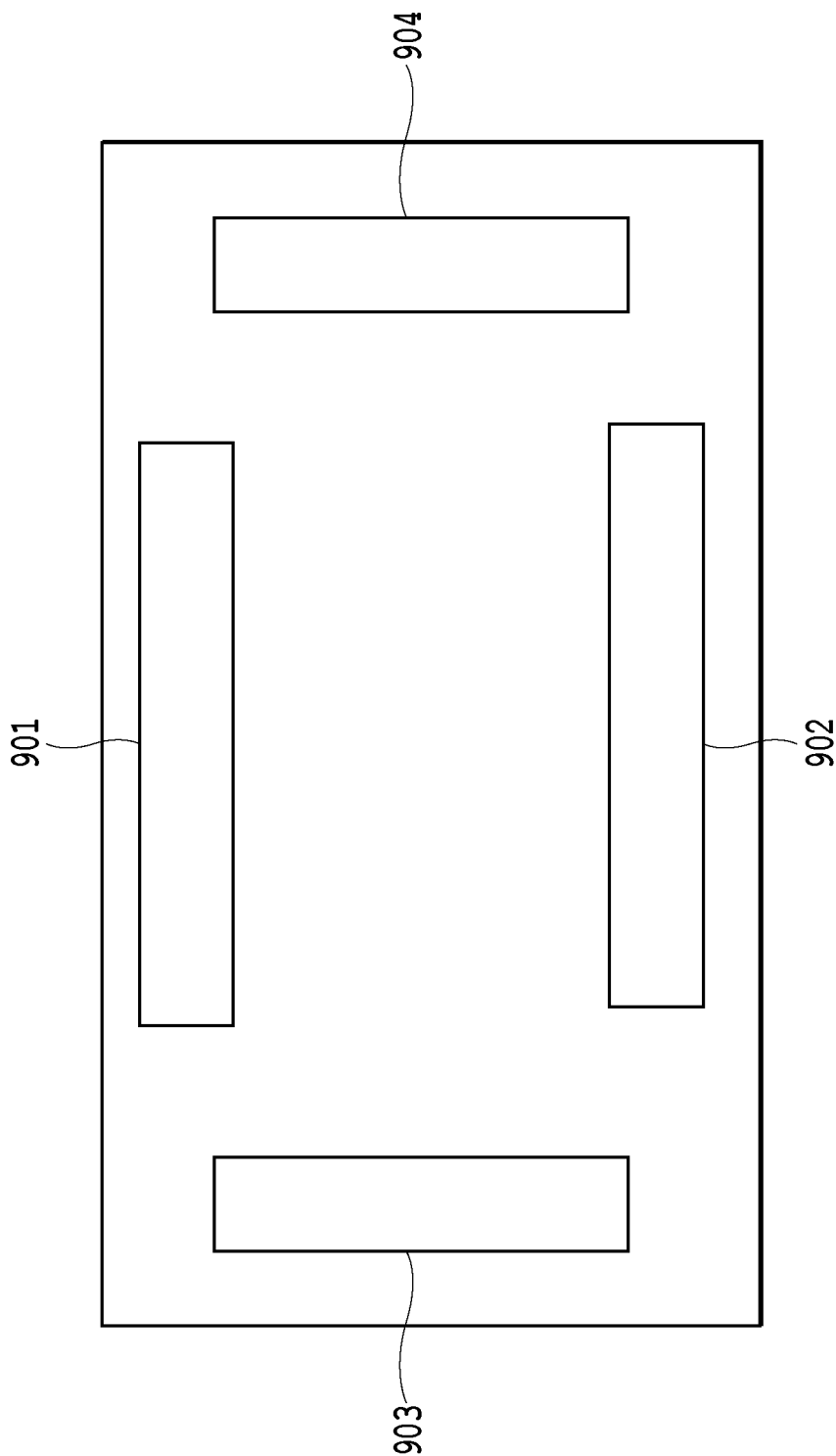

IMAGE PROCESSING APPARATUS, IMAGE PROCESSING METHOD, AND COMPUTER-READABLE RECORDING MEDIUM

BACKGROUND OF THE INVENTION

1. Field of the Invention

The present invention relates to an image processing apparatus, an image processing method, and a computer-readable recording medium for determining a motion vector between a plurality of images.

2. Description of the Related Art

Conventionally, there have been disclosed techniques that calculate motion vectors between a plurality of frames to perform alignment between the frames.

A reference image refers to an arbitrary image frame in a motion picture frame. When calculating a motion vector of the reference image, a feature point that characterizes the image is used. Specifically, the calculation of a motion vector of the reference image is performed by calculating a difference between a feature point of the reference image and a certain region in a comparison image corresponding to the feature point. Japanese Patent Publication No. 3935500 discloses a method of dividing an image into triangular regions comprised of feature points when performing alignment between the frames by the motion vector of each feature point arranged irregularly. That is, by dividing an image into triangles having feature points at the vertexes, it is possible to estimate (interpolate) the motion vector of the pixel or region inside the triangle by the motion vectors of the feature points forming the triangle. Because of this, even when the feature points are arranged irregularly, it is made possible to calculate a motion vector with a certain kind of regularity.

However, the technique described in the above-mentioned Japanese Patent Publication No. 3935500 has such a problem that a triangle with an extremely large distortion appears depending on the arrangement of feature points. When interpolating a motion vector by a triangle with a large distortion, the following problems occur.

That is, because the distances between feature points constituting a divided region increase and the motion vector of a pixel and the like inside the region is estimated (interpolated) by the motion vector of the far distant feature point, there may be a case where the interpolation precision is reduced. In addition to the above, when the distortion itself of the region becomes too large, there is a possibility that the internal interpolation precision itself cannot be maintained any more.

SUMMARY OF THE INVENTION

According to the present invention, the precision of a motion vector determined for a pixel included in an image is improved by appropriately performing region division of the image.

An image processing apparatus according to the present invention comprises an obtaining unit configured to obtain a plurality of images, an extraction unit configured to extract a feature point of the image by analyzing any of the plurality of images obtained by the obtaining unit, a first addition unit configured to add a feature point of the image to a corner of the image, a second addition unit configured to add at least one feature point to any of positions on four sides consisted of feature points located at the corners of the image, and a determination unit configured to determine a motion vector of a pixel included in the image with respect to another image included in the plurality of images based on the feature point extracted by the extraction unit and the feature points added by the first addition unit and the second addition unit.

According to the present invention, it is possible to improve the precision of a motion vector of a pixel included in an image by appropriately performing region division of the image.

Further features of the present invention will become apparent from the following description of exemplary embodiments (with reference to the attached drawings).

BRIEF DESCRIPTION OF THE DRAWINGS

FIG. 9 is a diagram showing a region where a distribution of feature points is analyzed.

DESCRIPTION OF THE EMBODIMENTS

Figure 1:
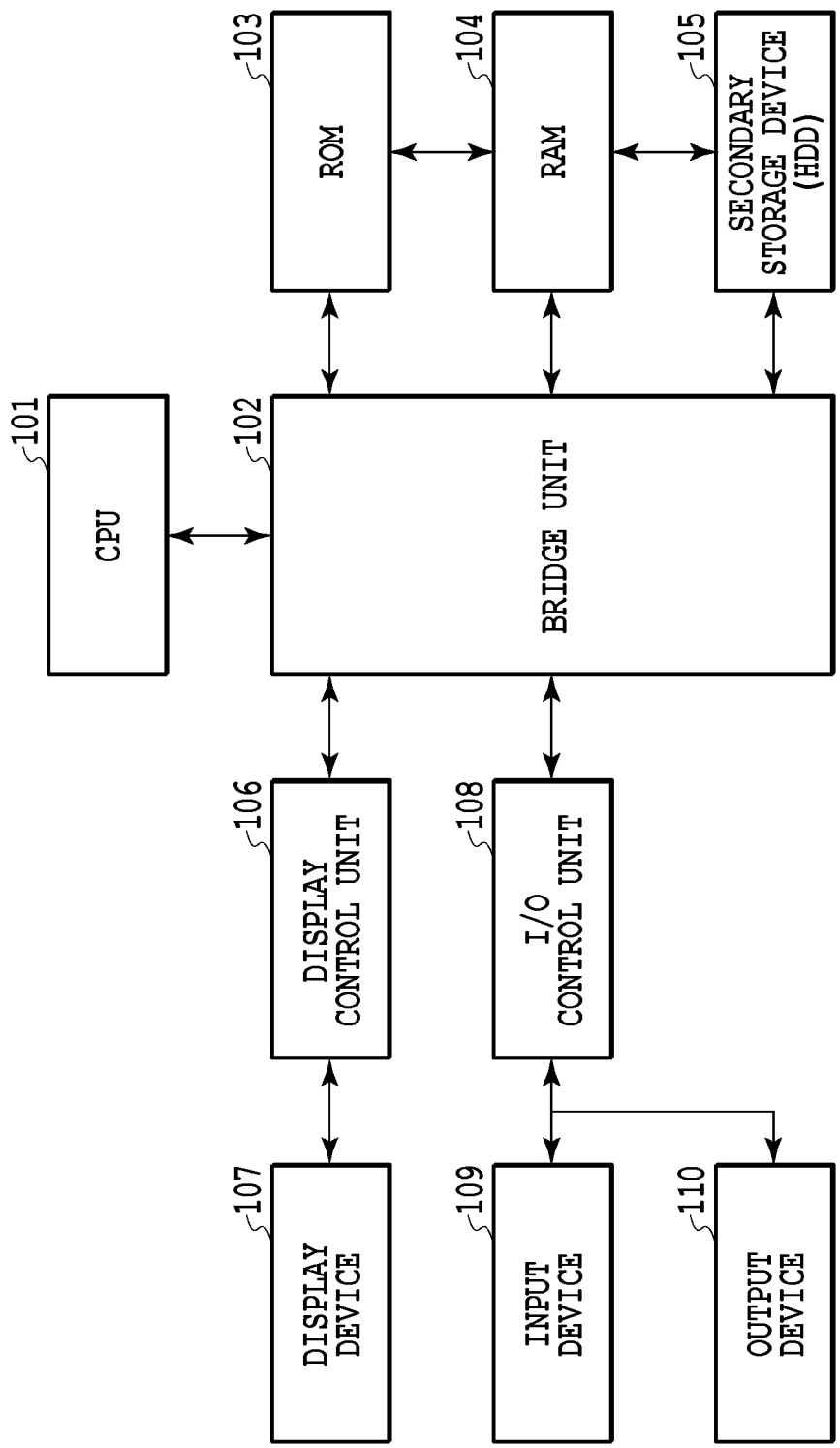
FIG. 1 is a diagram showing an example of a block configuration of an image processing apparatus according to an embodiment.

FIG. 1 shows a block diagram of an image processing apparatus according to an embodiment. Explanation is given on the assumption that a PC (Personal Computer) is used as an image processing apparatus.

A CPU (Central Processing Unit) 101 controls other functional blocks or apparatuses. A bridge unit 102 provides a function to control transmission/reception of data between the CPU 101 and the other functional blocks.

A ROM (Read Only Memory) 103 is a nonvolatile memory and stores a program called a BIOS (Basic Input/Output System). The BIOS is a program executed first when an image processing apparatus is activated and controls a basic input/output function of peripheral devices, such as a secondary storage device 105, a display device 107, an input device 109, and an output device 110.

A RAM (Random Access Memory) 104 provides a storage region where fast read and write are enabled. The secondary storage device 105 is an HDD (Hard Disk Drive) that provides a large-capacity storage region. When the BIOS is executed, an OS (Operating System) stored in the HDD is executed. The OS provides basic functions that can be used by all applications, management of the applications, and a basic GUI (Graphical User Interface). It is possible for an application to provide a UI that realizes a function unique to the application by combining GUIs provided by the OS.

The OS and data used in an execution program or working of another application are stored in the RAM 104 or the secondary storage device 105 according to the necessity.

A display control unit 106 generates image data of the GUI of the result of the operation by a user performed for the OS or application and controls the display on the display device 107. As the display device 107, a liquid crystal display or CRT (Cathode Ray Tube) display can be used.

An I/O control unit 108 provides an interface between a plurality of the input devices 109 and the output devices 110. As a representative interface, there are a USB (Universal Serial Bus) and PS/2 (Personal System/2).

The input device 109 includes a keyboard and mouse with which a user enters his/her intention to the image processing apparatus. Further, by connecting a digital camera or a storage device such as a USB memory, a CF (Compact Flash) memory and an SD (Secure Digital) memory card and the like to the input device 109, it is also possible to transfer image data.

It is possible to obtain a desired print result by connecting a printer as the output device 110. The application that realizes image processing according to an embodiment is stored in the secondary storage device 105 and provided as an application to be activated by the operation of a user.

Figure 2:
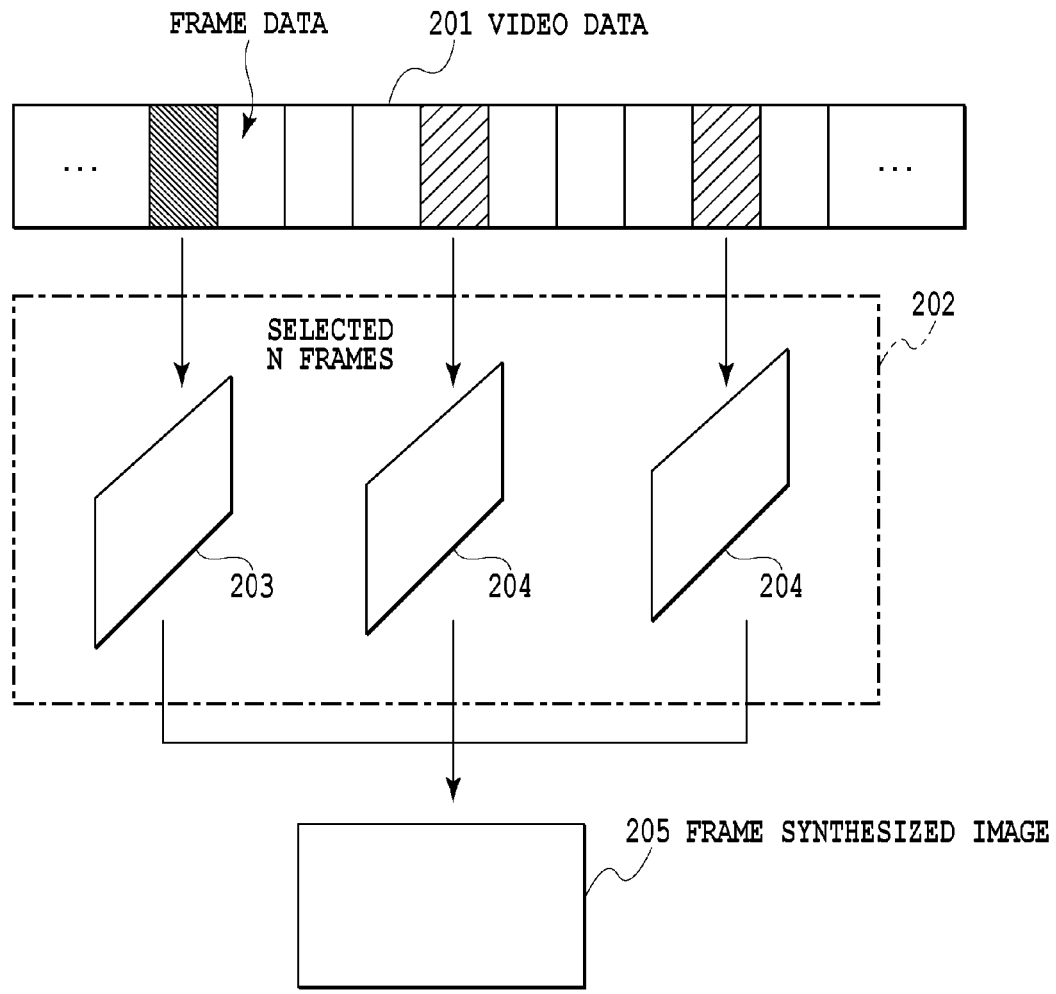
FIG. 2 is conceptual diagram showing an outline of a method of creating a frame multiplex image.

FIG. 2 is a conceptual diagram showing an outline of a method of generating a frame multiplex image according to an embodiment. Video data 201 consists of a plurality of frame images. From the video data 201, a frame group 202 including N (N is an integer not less than two) frames is selected within a specified range, and a multiplex image (frame synthesized image) 205 is generated by estimating a positional relationship between these frame images.

In FIG. 2, it is shown that three (N=3) frames are selected. Hereinafter, a frame 203 specified by a user is described as a reference image and a frame 204 in the neighborhood thereof as a comparison image. As shown in FIG. 2, the comparison image 204 includes not only the frame image nearest to the reference image 203 but also any image near the reference image. An image near the reference image refers to an image located near in the video frame in terms of time.

Figure 3:
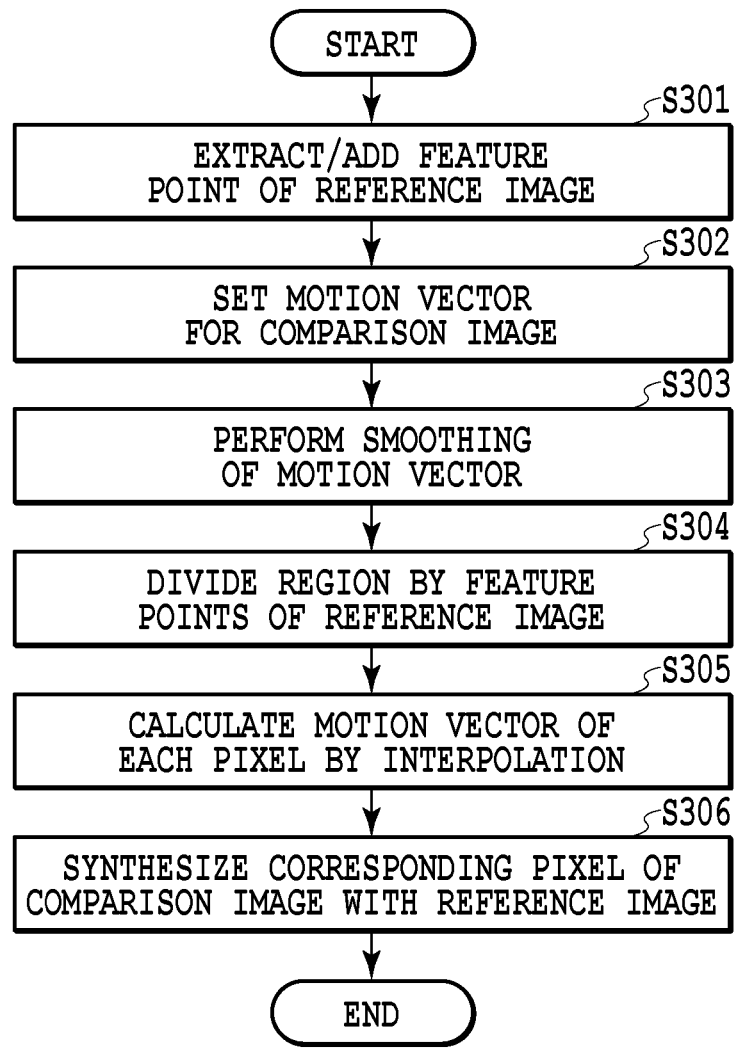
FIG. 3 is a diagram showing a flowchart of image processing according to an embodiment.

FIG. 3 is a flowchart of frame multiplex image creation process according to an embodiment. In FIG. 3, general processing to create a multiplex image is explained and characteristic processing according to an embodiment will be described later. Prior to the processing in FIG. 3, a reference image is obtained. First, the reference image 203 is analyzed and a feature point of the reference image is extracted (S301). As a feature of the image, one with which a correspondence relationship with a comparison image can be easily identified is extracted as a feature point. For example, a point where edges cross (for example, four corners of a building window) or local singular point is extracted as a feature point. The processing shown in FIG. 3 can be realized by the CPU 101 executing the program stored in the ROM 103.

Next, a region within the comparison image 204 corresponding to each feature point extracted from the reference image 203 in the feature point extraction process in S301 is identified. It is possible to identify a region within the comparison image 204 corresponding to not only the feature point extracted in S301 but also a feature point newly added, as will be described later. Details of a feature point to be added will be described later. As an identification method, it is possible to identify a region corresponding to a feature point by comparing the reference image 203 and the comparison image 204 by using, for example, block matching and the like. At this time, a difference between the coordinate value of a pixel in the reference image 203 extracted as a feature point in the reference image 203 and the coordinate value of a region corresponding to a feature point in the comparison image 204 is set as a motion vector (S302).

There is a case where a region that matches with the feature point in the reference image 203 is not detected in the comparison image 204. That is, in the case of a motion picture, when a camera that has taken an image is moved, the composition itself changes between frames and a subject also moves, and therefore, the feature point extracted from the reference image does not necessarily exist within the comparison image. Consequently, there may be a case where a region that does not originally match with a feature point in the comparison image is detected erroneously as a region corresponding to a feature point when detecting a feature point of the reference image from the comparison image and a motion vector is set based on the detection result. Because of this, it may also be possible to set a degree of reliability to a motion vector itself based on, for example, the comparison result between the reference image and the comparison image. Then, by setting a motion vector of the feature point while reflecting the degree of reliability of one or more motion vector(s) set to its peripheral feature point(s) and thus smoothing of the motion vector is performed (S303).

Next, region division of an image is made by the feature points of the reference image. At this time, the feature point appears at an arbitrary position, and therefore, by setting a plurality of triangular regions consisted of feature points, the image is divided (S304). The division of a region into triangles can be realized by making use of, for example, the method of Delaunay triangulation. In an embodiment, an example is shown in which an image is divided into triangular regions, however, an image may be divided into other polygonal regions, such as quadrangular regions.

In order to perform processing of all the image regions in the reference image, the four corners of the image are added (if not extracted as feature point) as feature points (first addition process). That is, for example, when one corner has already been extracted as a feature point, feature points are added to the other three corners. A feature point to be added may be added to a position in the neighborhood of the four corners of the image. The four corners of an image and parts in the neighborhood thereof are together referred to as corners. A motion vector corresponding to the added feature point can be identified by a correspondence relationship with the comparison image. That is, a region resembling the added feature point is identified by matching process in the comparison image. However, the added feature point is a region not extracted as a feature point originally, and therefore, there is a case where it is hard to identify the correspondence relationship between images. Because of that, it may also be possible to set a motion vector corresponding to the added feature point by making use of the motion vector of at least one extracted feature point existing in the neighborhood of the added feature point.

Figure 4:
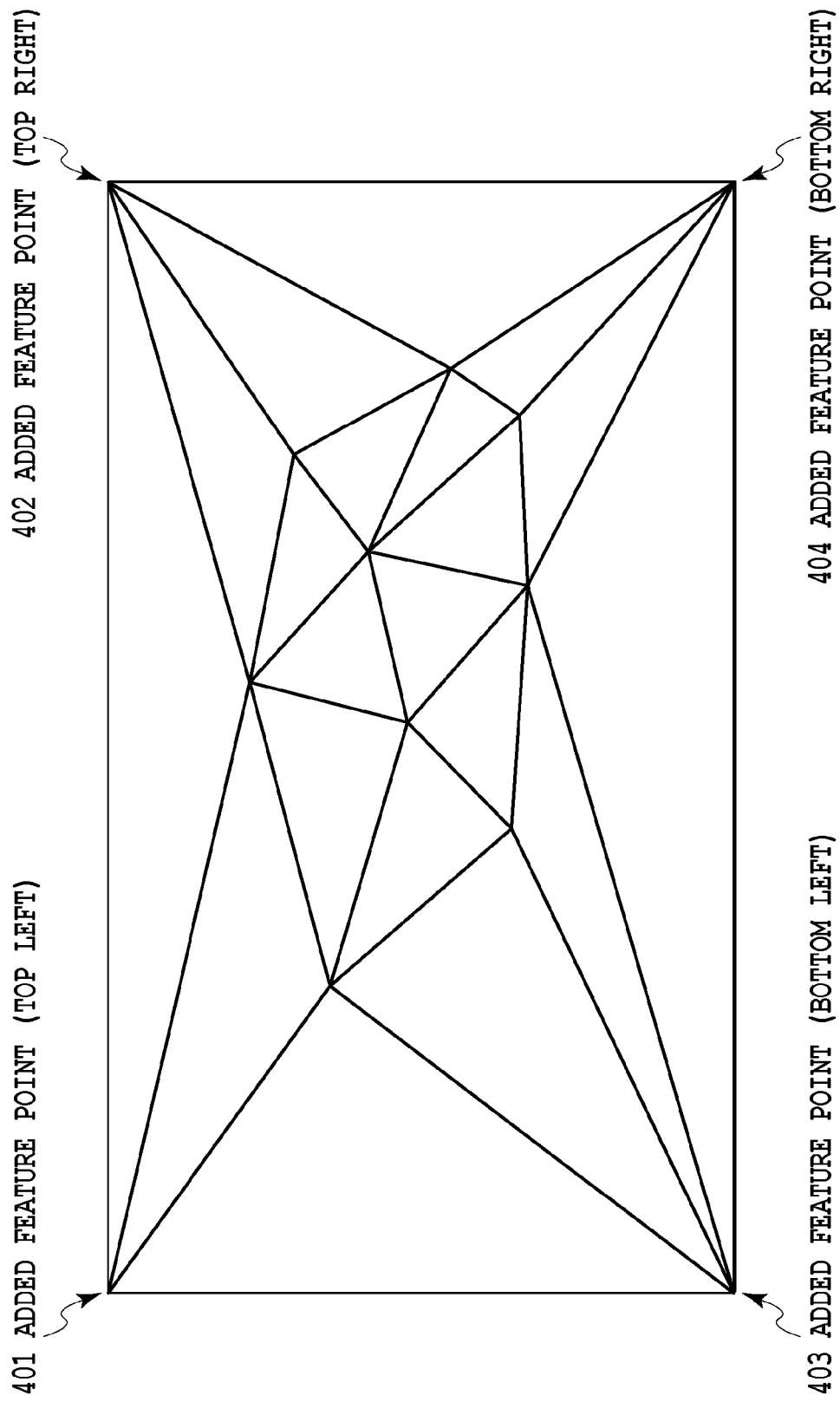
FIG. 4 is a diagram showing an example in which an image is divided into triangular regions by feature points including added feature points to the image.

FIG. 4 is an example of region division of a reference image including extracted feature points and added feature points. The vertex of each triangle represents a feature point. It is known that all the pixels constituting the image belong to any of the triangular regions by adding four corners (401, 402, 403 and 404) as feature points as shown schematically. Because all the pixels constituting the image belong to any of the triangular regions, it is possible to estimate (interpolate) a motion vector of an arbitrary pixel and the like within the triangular region for all the pixels constituting the image. The addition of a feature point is explained in relation to S304 for the sake of simplification of the explanation. However, as will be described later, the processing of adding a feature point may also be performed in S301.

Figure 5:
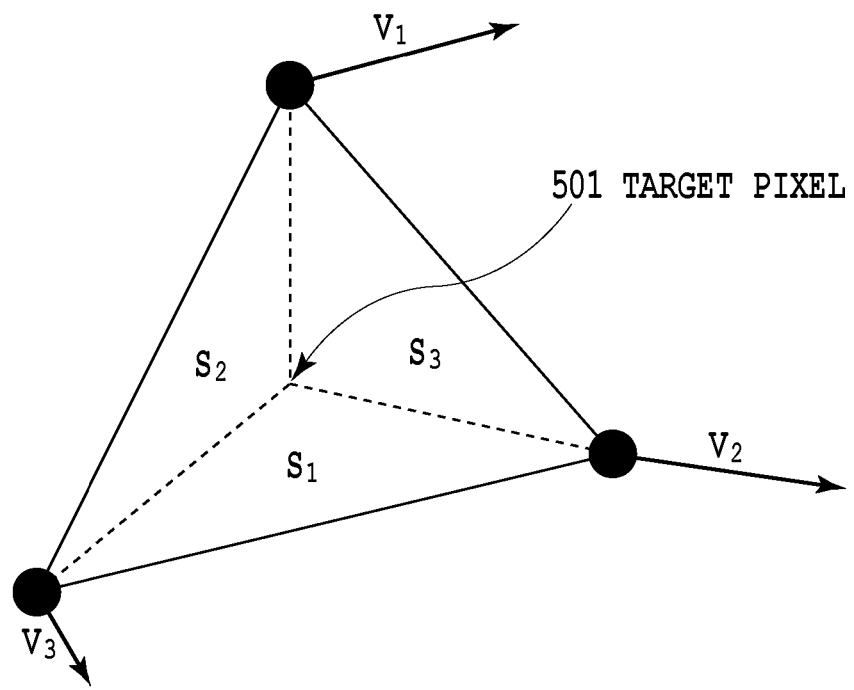
FIG. 5 is a diagram showing how to find a motion vector of a target pixel by area interpolation of a triangle.

Next, based on the divided triangular regions, a corresponding pixel of the comparison image is determined for each pixel of the reference image. FIG. 5 is a diagram showing a target pixel 501 of the reference image and a triangular region to which the target pixel 501 belongs. The vertexes constituting the triangle to which the target pixel 501 belongs represent feature points and a motion vector is set for each of the feature points.

Consequently, the motion vector of the target pixel 501 is determined by weight-averaging motion vectors ($V_1$, $V_2$ and $V_3$) of the three feature points by three areas ($S_1$, $S_2$ and $S_3$) of the triangles divided by the target pixel (S305). That is, the motion vector element of each feature point is multiplied by the area of the triangle having a side not including itself as a feature point as a weight and the sum of these products is divided by the total of the three areas with which the triangle formed by the feature points is divided. That is, a motion vector V of the target pixel 501 is obtained by the following equation (1).

$$V=(S_1V_1+S_2V_2+S_3V_3)/(S_1+S_2+S_3) \quad (1)$$

Finally, the value of pixel of the comparison image, where the pixel is moved by an amount corresponding to the motion vector calculated by interpolation as described above, is synthesized with the target pixel 501 of the reference image at the coordinates thereof (S306). By matching the positional relationship and synthesizing the reference image with the comparison image as described above, it is possible to expect, for example, the effect of noise reduction for a motion picture frame photographed in a dark position.

Next, it is explained about region division of an image according to an embodiment specifically.

Figure 6:
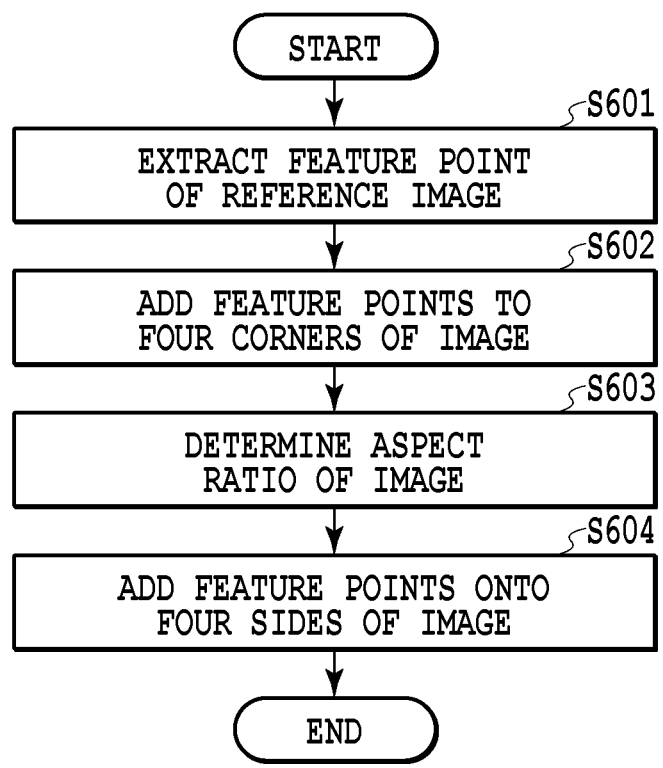
FIG. 6 is a diagram showing a flowchart of image processing.

FIG. 6 shows a flowchart of image processing according to an embodiment, explaining S301 in FIG. 3 in more detail. After extracting feature points of the reference image (S601), the four corners of the image are added as first feature point addition process (S602).

Figure 7:
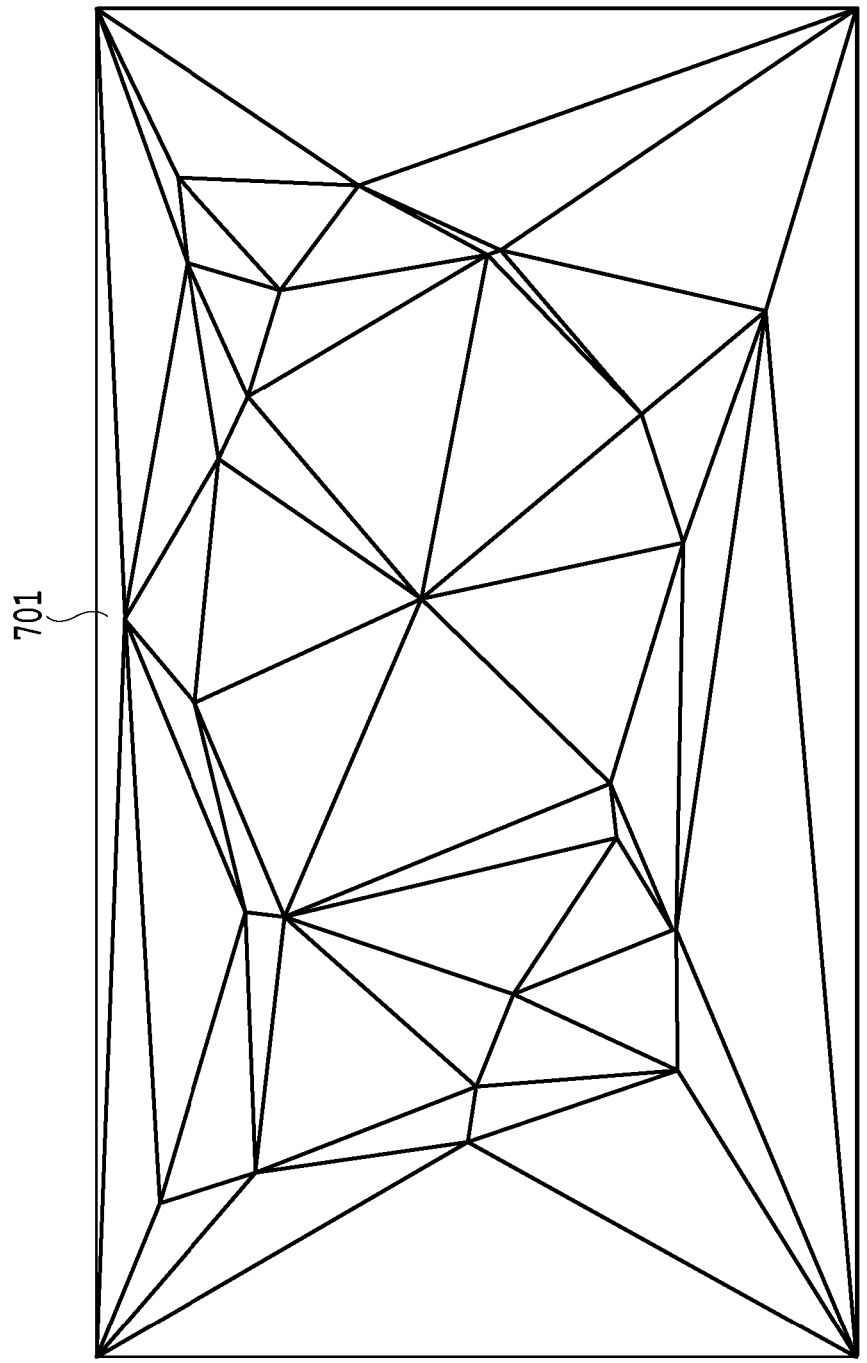
FIG. 7 is a diagram showing an example in which an image is divided into triangular regions by feature points.

Here, when the number of feature points increases to a certain level, there is a case where a triangle with a large distortion appears as shown in FIG. 7. For example, at an image upper end part 701, a triangle having a long side of the image as one side is formed. In addition to this, when an extracted feature point is close to each side, a considerably distorted triangle is formed. When a motion vector is found by area interpolation based on such a triangle, the interpolation precision is reduced and at the same time, a motion vector is estimated by a far distant feature point as a result.

Accordingly, in an embodiment, an aspect ratio of an image is determined (S603) and feature points in the number based on the determination result are added onto the four sides of the image as second addition process (S604).

The number of feature points to be added onto the side is not limited to the number based on the aspect ratio and a predetermined number of feature points may be added.

If feature points are added onto each side of the image as described above, it is unlikely that the whole of each side of the image is used as one side of a triangle but a triangle having a part of each side as one side is formed as a result. Because of this, it is possible to limit the length of a triangle by the intervals between feature points to be added, and therefore, to form a triangle with a small distortion.

For example, a high-vision motion picture has an aspect ratio of 16:9, and therefore, 15 feature points to equally divide the long side into 16 parts and 8 feature points to equally divide the short side into 9 parts are added onto the sides excluding the four corners of the image. Due to this, it is possible to divide the sides of the image so that the lengths of sides of the triangles are the same on the long side and the short side of the image.

However, the feature points to be added are not extracted originally as feature points, and therefore, the possibility that the estimation precision itself of the motion vector is reduced is high. Consequently, in the case of a high-vision motion picture, the aspect ratio is assumed to be about 2:1 and in actuality, it is considered to add two feature points to the long side and one feature point to the short side. In the case of a conventional standard motion picture, the aspect ratio is 4:3, and therefore, it is considered to add one feature point to the long side and the short side, respectively, on the assumption that the aspect ratio is about 1:1.

Here, the setting of the motion vector of the added feature point may be made with a lower degree of reliability in the vector smoothing in S303 described above. Alternatively, it may also be possible to set the motion vector of the added feature point from the motion vector of the extracted feature point located in the neighborhood thereof. For example, it is also possible to set the motion vector of the extracted feature point nearest to the added feature point as the motion vector of the added feature point.

Figure 8:
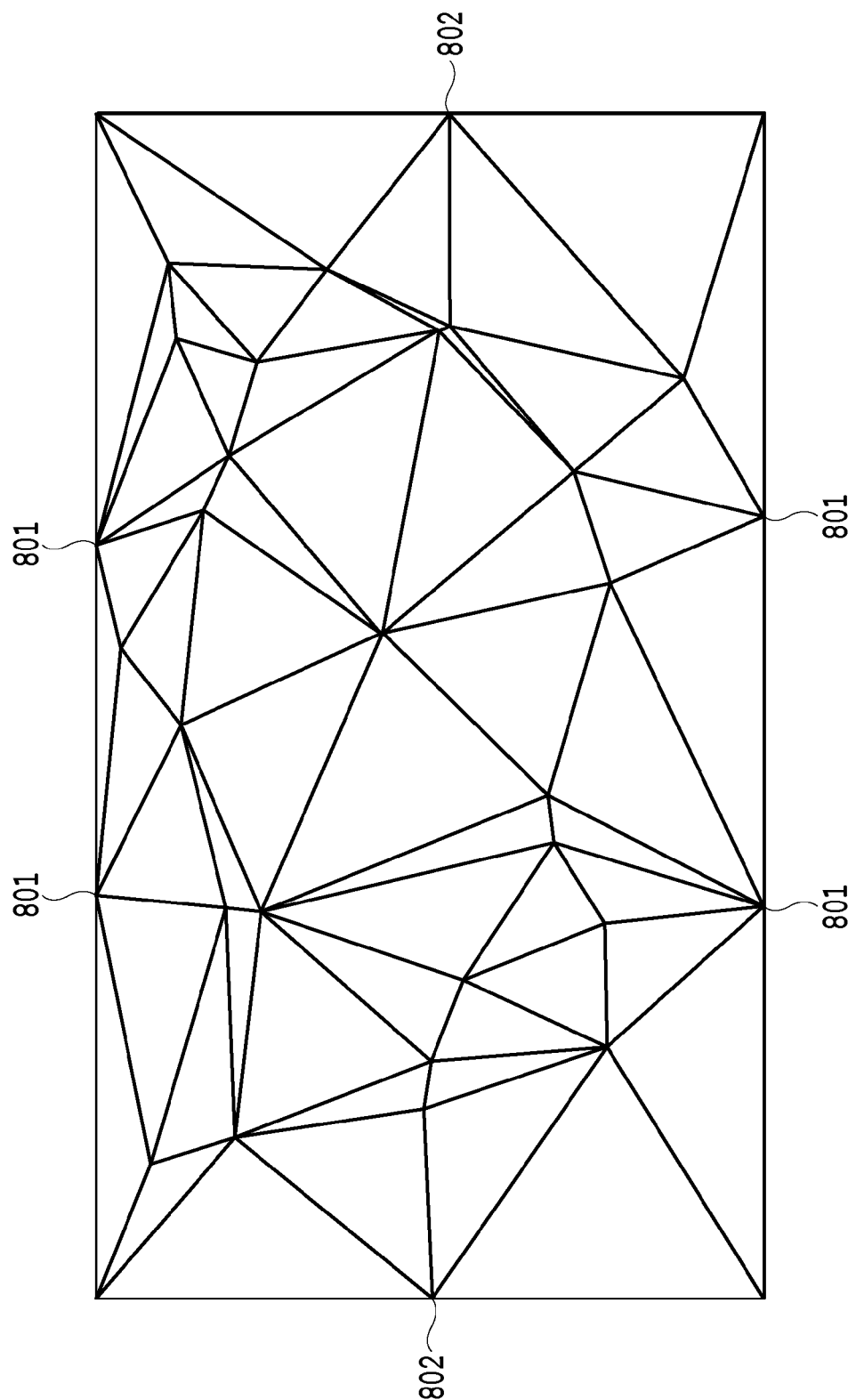
FIG. 8 is a diagram showing an example in which an image is divided into triangular regions by feature points.

FIG. 8 shows an example in which the reference image having an aspect ratio of 16:9 as shown in FIG. 7 is divided into triangular regions by adding two feature points to the long sides, respectively, and one feature point to the short sides, respectively. That is, two feature points represented by 801 are added to each long side and a feature point represented by 802 is added to each short side. As shown in FIG. 8, it is possible to divide the distorted triangles particularly in the region near each side, and therefore, the individual distortion can be reduced.

The method of adding feature points to be added to each side of an image based on the aspect ratio of the image is explained as above. Next, a method of determining the number of feature points to be added to each side of an image based on the number and positions of feature points to be extracted is explained.

In general, as the number of feature points to be extracted increases, triangulation becomes more complicated. Further, the distortion of a triangle having one side constituting each side of an image is determined by the position of an extracted feature point nearest to each side. Consequently, in an embodiment, a method of determining feature points to be added in view of these characteristics is explained.

First, as the simplest method, the number of feature points to be added onto the side of the image described above is determined by the number of extracted feature points extracted from the image. At this time, a threshold value for the number of extracted feature points may be set or the number of feature points to be added may be determined in proportion to the number of extracted feature points. In this case, it may also be possible to determine the minimum number of feature points to be added to the long side and the short side in advance from the aspect ratio of the image as described above. For example, when the aspect ratio of the image is 16:9 as described above, it is possible to set the minimum number of feature points to be added to the long side to two and that to the short side to one on the assumption that the aspect ratio is about 2:1. Due to this, at least two feature points are added to the long side of the image and at least one feature point is added to the short side of the image. As described above, it is considered to determine an upper limit because simply increasing the number of feature points to be added does not necessarily lead to good results as described above.

Next, a method of determining the number of feature points to be added based on the position of the feature point nearest to each side constituting an image is explained. As described above, the nearer the extracted feature point to each side, the larger the distortion of a triangle becomes. Consequently, the number of feature points to be added to each side is adjusted based on the distance between each side and the nearest extracted feature point. For example, when the extracted feature point is very near to each side, it is possible to determine a larger number of feature points to be added to each side compared to the case where the extracted feature point is more distant. Due to this, it is possible to reduce the distortion of the triangle. Here also, it is considered to set an upper limit of the number of feature points to be added to each side.

Further, it may also be possible to analyze the arrangement of the extracted feature points in detail. As shown in FIG. 9, a neighborhood region (901 to 904) is set for each side. It may also be possible to adjust the number of feature points to be added based on the number of extracted feature points in each region. That is, it may also be possible to determine the number of feature points to be added based on the distribution of the feature points existing in the neighborhood region of each side of the four sides.

Alternatively, when the number of extracted feature points is equal to or less than a predetermined threshold value (for example, 300 points), it may also be possible to determine the number of feature points to be added based on the aspect ratio of the image. Then, when the number of extracted feature points is greater than the threshold value, it may also be possible to adjust the number of feature points to be added onto the sides of the image according to the number and positions of the extracted feature points extracted from the image.

The motion vector calculation method according to an embodiment can be applied to a noise reduction processing method on a computer, an imaging apparatus with a noise reduction function installed therein, such as a digital camera and a digital video camera, and the like.

An embodiment is disclosed as the triangulation in the two-dimensional space plane when an image is handled, however, it is also possible to extend the present invention into the three-dimensional space. For example, color customization can be supposed, in which a plurality of arbitrary colors is corrected into preferred colors in the three-dimensional color space. If an arbitrary color desired to be corrected is deemed as a feature point and an amount of correction is deemed as a motion vector, the space can be divided into a plurality of tetrahedrons by the feature points. In such a case, there is a possibility that a tetrahedron with a large distortion appears as in the case of the two-dimensional triangle and it is needless to say the same problem can be solved by applying the present invention.

OTHER EMBODIMENTS

Aspects of the present invention can also be realized by one or more computer of a system or apparatus (or devices such as one or more CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer(s) for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162289, filed Jul. 16, 2010, which is hereby incorporated by reference herein in its entirety.

What is claimed is:

1. An image processing apparatus comprising:
    an obtaining unit configured to obtain a plurality of images;
    an extraction unit configured to extract one or more feature points of an image of the plurality of images, obtained by the obtaining unit, by analyzing the image;
    an addition unit configured to add a feature point of the image to a corner of the image and to add at least one feature point, depending on an aspect ratio of the image, in a number corresponding to the aspect ratio onto four sides of the image; and
    a determination unit configured to determine a motion vector of a pixel included in the image with respect to another image included in the plurality of images based on the feature point(s) extracted by the extraction unit and the feature points added by the addition unit.

2. The image processing apparatus according to claim 1, wherein the addition unit adds the feature point to a position according to the aspect ratio of the image.

3. The image processing apparatus according to claim 1, wherein the addition unit adds the feature points, in a number which is based on the aspect ratio and a number of feature point(s) extracted from an image by the extraction unit, onto the four sides of the image.

4. The image processing apparatus according to claim 1, wherein the addition unit adds feature points, in a number which is based on the aspect ratio and the distance between each side of the four sides of the image and the feature point(s) extracted from the image by the extraction unit, onto the four sides of the image.

5. The image processing apparatus according to claim 1, wherein the addition unit determines a number of feature points to be added onto the four sides of the image based on a distribution of the feature point(s) which are each located in a neighborhood region of each side of the four sides and extracted from the image by the extraction unit.

6. The image processing apparatus according to claim 1, wherein the addition unit, in a case where a feature point is extracted by the extraction unit at a part located at a corner of the image, does not add a feature point to the part located at the corner.

7. The image processing apparatus according to claim 1, comprising a setting unit configured to set a region for the image based on the feature point(s) extracted from the image by the extraction unit and the feature points added to the image by the addition unit,
    wherein the determination unit determines motion vectors of the feature point(s) extracted by the extraction unit and the feature points added by the addition unit and determines a motion vector of a pixel included in the region of the image set by the setting unit based on the motion vectors of the feature points.

8. The image processing apparatus according to claim 7, wherein the setting unit sets, for the image, a triangular region including the feature points extracted from the image by the extraction unit or the feature points added to the image by the addition unit.

9. An image processing method comprising:
    an obtaining step of obtaining a plurality of images;
    an extraction step of extracting one or more feature points of an image of the plurality of images, obtained in the obtaining step, by analyzing the image;

an addition step of adding a feature point of the image to a corner of the image and adding, depending on an aspect ratio of the image, at least one feature point in a number corresponding to the aspect ratio onto four sides of the image; and a determination step of determining a motion vector of a pixel included in the image with respect to another image included in the plurality of images based on the feature point(s) extracted in the extraction step and the feature points added in the addition step.

10. A non-transitory computer-readable recording medium storing program to cause a computer to execute the image processing method according to claim 9.

11. The image processing apparatus according to claim 1, wherein the determination unit determines the motion vector based on the extracted feature point(s) extracted by the extracting unit and the added feature points added by the addition unit, by weighting the extracted feature point(s) rather than the added feature points.

12. The image processing apparatus according to claim 1, wherein, in a case where the aspect ratio of a horizontal side and a vertical side of the image is 16:9, the addition unit adds two feature points to the horizontal side and one feature point to the vertical side, and in a case where the aspect ratio is 4:3, the addition unit adds one feature point to each of the horizontal side and the vertical side.

13. The image processing method according to claim 9, wherein the addition step adds the feature point to a position according to the aspect ratio of the image.

14. The image processing method according to claim 9, wherein the addition step adds the feature points, in a number which is based on the aspect ratio and a number of feature point(s) extracted from the image in the extraction step, onto the four sides of the image.

15. The image processing method according to claim 9, wherein the addition step adds the feature points, in a number which is based on the aspect ratio and the distance between each side of the four sides of the image and the feature point(s) extracted from the image in the extraction step, onto the four sides of the image.

16. The image processing method according to claim 9, wherein the addition step determines a number of feature points to be added onto the four sides of the image based on a distribution of the feature point(s) which are each located in a neighborhood region of each side of the four sides and extracted from the image in the extraction step.

17. The image processing method according to claim 9, wherein the addition step, in a case where a feature point is extracted in the extraction step at a part located at a corner of the image, does not add a feature point to the part located at the corner.

18. The image processing method according to claim 9, comprising a setting step of setting a region for the image based on the feature point(s) extracted from the image in the extraction step and the feature points added to the image in the addition step,
wherein the determination step determines motion vectors of the feature point(s) extracted in the extraction step and the feature points added in the addition step and determines a motion vector of a pixel included in the region of the image set in the setting step based on the motion vectors of the feature points.

19. The image processing method according to claim 9, wherein the determination step determines the motion vector based on the extracted feature point(s) extracted in the extracting step and the added feature points added in the addition step, by weighting the extracted feature point(s) rather than the added feature points.

20. The image processing method according to claim 9, wherein, in a case where the aspect ratio of a horizontal side and a vertical side of the image is 16:9, the addition step adds two feature points to the horizontal side and one feature point to the vertical side, and in a case where the aspect ratio is 4:3, the addition step adds one feature point to each of the horizontal side and the vertical side.

* * * * *